(No Model.)
C. WATSON & C. E. ADAMS.
SNOW SHOVEL.
No. 316,509. Patented Apr. 28, 1885.
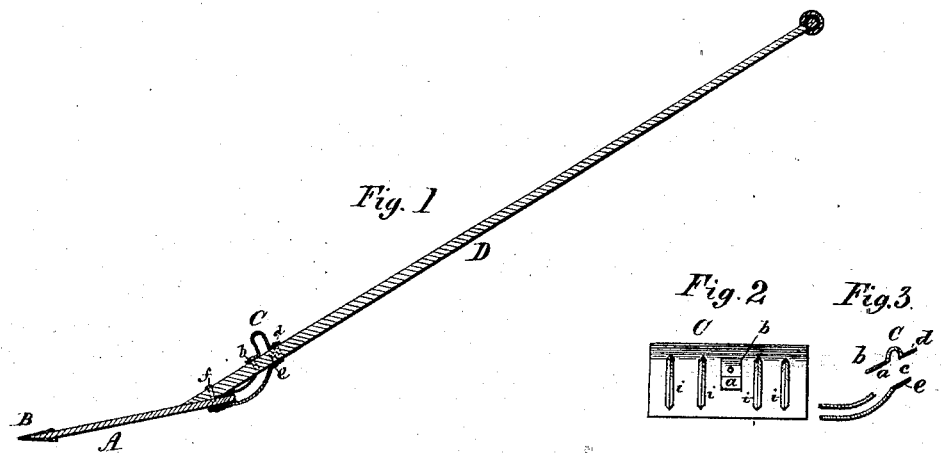
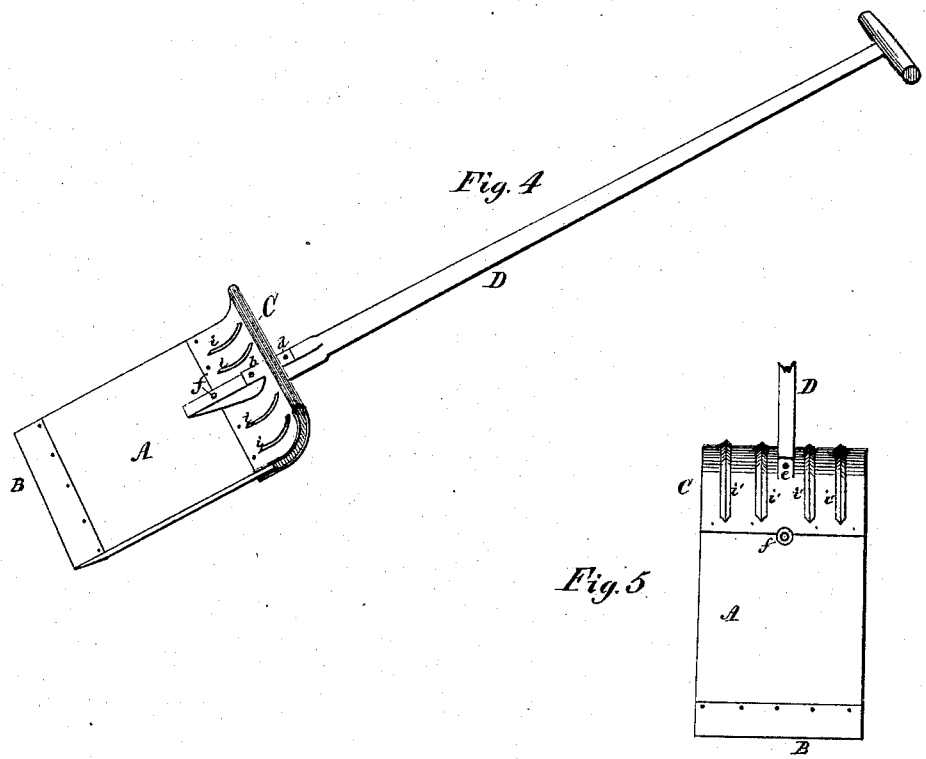
Witnesses.
R. H. Freeman
Hugh C. Sweeney.
Inventors
Christopher Watson
Chas. E. Adams
By W. Bruce
att'y

UNITED STATES PATENT OFFICE.

CHRISTOPHER WATSON AND CHARLES E. ADAMS, OF PARIS, ONTARIO, CANADA.

SNOW-SHOVEL.

SPECIFICATION forming part of Letters Patent No. 316,509, dated April 28, 1885.

Application filed March 12, 1885. (No model.)

*To all whom it may concern:*

Be it known that we, CHRISTOPHER WATSON, of the town of Paris, in the county of Brant, in the Province of Ontario, Dominion of Canada, and CHARLES EDWIN ADAMS, of the same place, have jointly invented certain new and useful Improvements in Snow-Shovels; and we do hereby declare that the following is a full, clear, and exact description of the construction and operation of the same.

The invention relates to the combination of metal and wood so constructed and combined as to form a snow-shovel that will possess the qualities of lightness, strength, and durability with comparative cheapness of manufacture.

The invention consists in taking a sheet of metal plate, corrugate it, stamp out two openings for the handle, bend it to a quarter-circle, rivet to it a wooden blade, and a wooden handle passed through the stamped openings and bolted to the blade by a single bolt riveted over a washer on the under side of the blade, and the handle further firmly secured to the sheet-metal stay-head by screws passing through lugs left on the edge of the handle-openings in the said metal stay-head. A sheet-metal shoe is riveted on the lower edge of the wooden blade to prevent its wear. The corrugations formed on the front and back of the sheet-metal stay-head, which is doubled, and the secure way the handle is attached to it and the blade, give the shovel great strength as well as lightness for convenience in handling.

By reference to the drawings forming part of this specification it will be seen that Figure 1 is a longitudinal section of shovel. Fig. 2 is a front view of sheet-metal stay-head. Fig. 3 is a vertical section of the same curved. Fig. 4 is a perspective view of the shovel. Fig. 5 is a rear elevation of the shovel with handle broken off.

A is the wooden blade, about three-eighths of an inch thick, and provided with a strip of sheet metal, B, riveted to it around the lower edge to protect the said blade from wear.

C is the sheet-metal stay-head, bent as shown at Fig. 3, having a handle-opening, $a$, punched out in front, but leaving a lug, $b$, and a similar opening, $c$, is cut out on three sides in the rear portion of the stay-head C, leaving two lugs, $d\ e$, above and below the said opening $c$, through which the wooden handle D passes, and is secured to the stay-head C by a screw through the lug $b$ in front and screws through the rear lugs, $d\ e$, while a bolt, $f$, passes through the lower end of the handle and blade, thus simply but effectually securing the handle to the blade and stay-head. The latter is still further strengthened by means of the corrugations $i$ on its front face and $i'$ on the rear portion of said stay-head. The corrugations will each be about half an inch wide and raised about one-quarter of an inch high, so as to give the parts stiffness and strength. All the portions of the shovel being securely braced and strengthened will enable it to stand a great deal of rough usage.

Having thus described our device, what we claim as our invention is—

1. In a snow-shovel, the sheet-metal stay-head C, double curved, as shown, and provided with handle-openings $a\ a$ and lugs $b\ d\ e$, struck out when forming the said openings $a\ c$, and corrugations $i\ i'$, substantially as specified.

2. In a snow-shovel, the combination of the double bent sheet corrugated metal stay-head C, blade A, and handle D, all constructed substantially as and for the purpose specified.

Dated at Paris, Ontario, this 7th day of March, A. D. 1885.

CHRISTOPHER WATSON.
CHAS. E. ADAMS.

In presence of—
ROBERT B. McRAE,
THOS. DOCHSTADER.